(No Model.)

H. C. ANDERSON.
CHURN.

No. 426,979. Patented Apr. 29, 1890.

Witnesses
J. M. Witherow,
A. W. Bishop,

Inventor
Henry C. Anderson,
By his Attorneys,
C. A. Snow & Co.

THE NORRIS PETERS CO., PHOTO-LITHO., WASHINGTON, D. C.

UNITED STATES PATENT OFFICE.

HENRY C. ANDERSON, OF WHITESBOROUGH, TEXAS, ASSIGNOR TO WILLIAM F. DAVIS AND JOHN B. CHOICE, OF SAME PLACE.

CHURN.

SPECIFICATION forming part of Letters Patent No. 426,979, dated April 29, 1890.

Application filed August 9, 1889. Serial No. 320,264. (No model.)

*To all whom it may concern:*

Be it known that I, HENRY C. ANDERSON, a citizen of the United States, residing at Whitesborough, in the county of Grayson and State of Texas, have invented a new and useful Churn, of which the following is a specification.

My invention relates to improvements in churns; and it consists in certain novel features hereinafter described and claimed.

Figure 1:
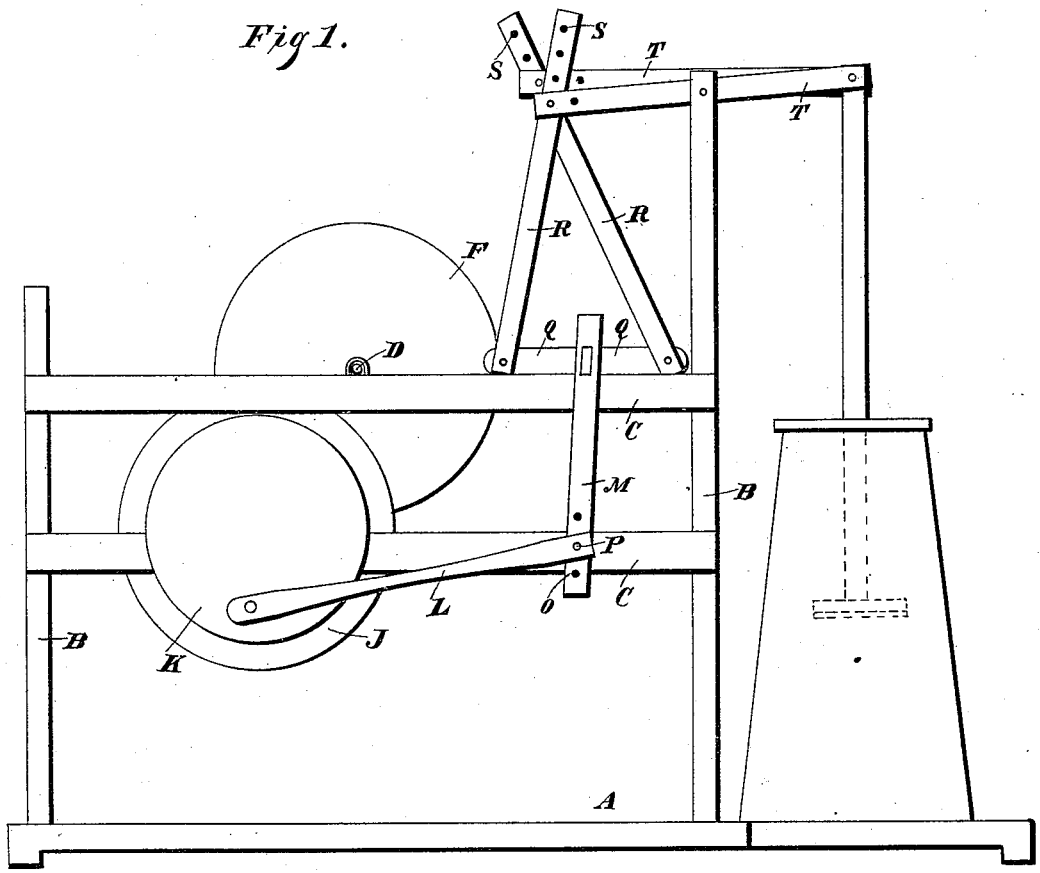
Figure 2:
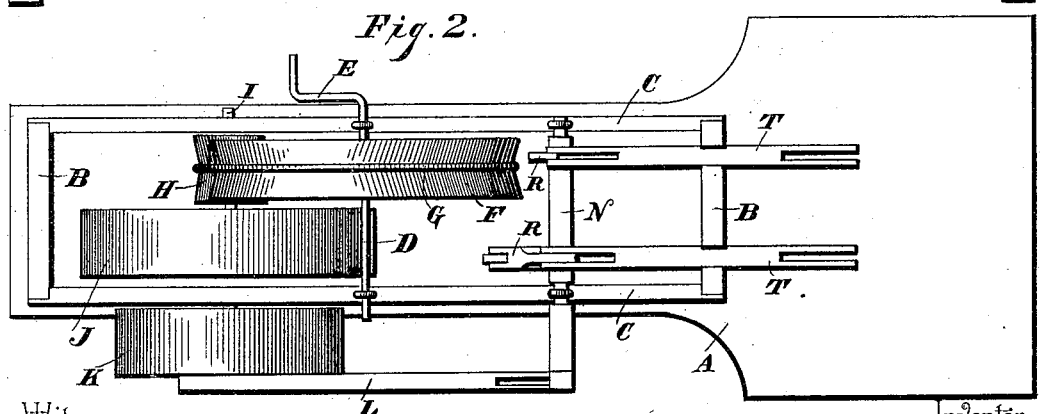

In the accompanying drawings, Figure 1 is a side view of my improved churn, and Fig. 2 is a plan view of the same.

In carrying out my invention I employ a base A, and on the said base I erect the standards B B, one of said standards being arranged at one end of the base, while the other is arranged a slight distance from the opposite end of the base, thereby providing a platform on which the churn-body is placed. The standards are connected and braced by the longitudinal bars C, which also serve as supports for the operating mechanism. The driving-shaft D is journaled in suitable bearings on the upper longitudinal bar C, and it is provided at one end with a crank-handle E, by means of which it may be rotated. The driving-wheel F is secured rigidly on the driving-shaft and is connected by a belt G with a pulley H, secured on a counter-shaft I, which is journaled on the lower longitudinal bar C. A balance-wheel J is secured on this shaft I, and it is provided at one end with a crank-disk K, the said crank-disk being connected by a pitman L with a crank-arm M, depending from a rock-shaft N, journaled on the upper bar C, as shown. The crank-arm M is provided with a longitudinal series of transverse perforations O, through any one of which and a suitable opening in the end of the pitman L a pivot-pin P is inserted, so as to secure the pitman to the crank-arm at any desired point, and thereby regulate the stroke. The rock-shaft N is provided between the beams C with the oppositely-extending crank-arms Q, and to the ends of these crank-arms I pivot the lower ends of the links or connecting-arms R, the upper ends of which are provided with a longitudinal series of transverse perforations S, as shown. The upper end of the front standard B is bifurcated, and within the bifurcations I pivot the double-armed levers T, the front ends of which are pivoted to the dasher-rods and the rear ends of which are pivoted to the connecting-rods R by means of suitable pins passed through the ends of the levers and any one of the openings S in the connecting-rods. By this arrangement I am enabled to adjust the parts so as to obtain any desired length and rapidity of stroke.

In practice the churn-body is placed on the base adjacent to the front standard, cream is placed in the churn-body, and the dasher-rods connected to the levers T. The driving-shaft is then rotated, and motion thereby imparted to the several parts, so that the dasher-rods will be reciprocated, and the cream consequently agitated so as to form butter.

It will be observed that in my device the parts are very compactly arranged and the dasher-rods will be reciprocated alternately in opposite directions, and that they may be given any desired length of stroke. When the driving-shaft is rotated, the motion of the same will be imparted directly to the counter-shaft, and a vibratory motion will be thereby given to the rock-shaft through the crank-disk and the pitman, as will be readily understood. The double-armed levers will thus be oscillated and the dashers thereby reciprocated. The several parts being very compactly arranged, the churn can be operated with comparatively little labor and will run easily and smoothly.

Having thus described my invention, what I claim, and desire to secure by Letters Patent, is—

The combination of the standards B B, the longitudinal bars C C, connecting the same, the driving-shaft journaled on the upper bars C, the counter-shaft journaled on the lower bars C and provided with a crank-disk K at one end, gearing between the driving-shaft and the counter-shaft, the balance-wheel on the counter-shaft, the rock-shaft N, journaled on the upper bars C and provided with the oppositely-extending crank-arms Q between the said bars, the crank-arm M, depending from the end of the rock-shaft, the pitman having one end pivoted to the crank-disk and its other end adjustably pivoted to the crank-arm M, the double-armed levers fulcrumed on the front standard and connected to the dasher-rods, and the links having the lower ends pivoted to the crank-arms Q and their upper ends adjustably pivoted to the levers T, as set forth.

In testimony that I claim the foregoing as my own I have hereto affixed my signature in presence of two witnesses.

HENRY C. ANDERSON.

Witnesses:
J. D. ANDERSON,
W. A. DARNALL.